United States Patent [19]

Kohno et al.

[11] Patent Number: 5,725,945
[45] Date of Patent: Mar. 10, 1998

[54] MAGNETIC RECORDING MEDIUM HAVING A FLUORINATED BLOCK POLYMERIC LUBRICANT

[75] Inventors: Kenji Kohno, Ibaraki; Kazushi Miyata, Mishima-gun, both of Japan

[73] Assignee: Hitachi Maxell, Ltd., Osaka, Japan

[21] Appl. No.: 668,007

[22] Filed: Jun. 19, 1996

Related U.S. Application Data

[63] Continuation of Ser. No. 327,407, Oct. 21, 1994, abandoned.
[51] Int. Cl.$^6$ ............................................. G11B 5/71
[52] U.S. Cl. ............... 428/341; 428/421; 428/422; 428/408; 428/450; 428/457; 428/694 TF; 428/694 BF; 428/694 TC; 428/694 TP; 428/900
[58] Field of Search .................... 428/341, 421, 428/422, 408, 450, 457, 694 TF, 694 BF, 694 TC, 694 TP, 900

[56] References Cited

U.S. PATENT DOCUMENTS

| | | | |
|---|---|---|---|
| 4,079,084 | 3/1978 | Houghton | 260/615 BF |
| 4,842,939 | 6/1989 | Scarati et al. | 428/421 |
| 4,897,211 | 1/1990 | Dekura et al. | 252/54 |
| 5,034,525 | 7/1991 | Dekura et al. | 544/196 |
| 5,091,269 | 2/1992 | Kondo et al. | 428/695 |
| 5,128,216 | 7/1992 | Ng | 428/695 |
| 5,332,798 | 7/1994 | Ferreri et al. | 528/61 |
| 5,391,814 | 2/1995 | Kai et al. | 560/197 |
| 5,476,721 | 12/1995 | Simeone et al. | 428/482 |

FOREIGN PATENT DOCUMENTS

| | | |
|---|---|---|
| 60-085427 | 5/1985 | Japan . |
| 62-023618 | 1/1987 | Japan . |
| 2-210615 | 8/1990 | Japan . |

*Primary Examiner*—Stevan A. Resan
*Attorney, Agent, or Firm*—Birch, Stewart, Kolasch & Birch, LLP

[57] ABSTRACT

A magnetic recording medium having a non-magnetic substrate and a magnetic layer formed on at least one surface of the substrate and containing a fluorine-containing lubricant on or in a surface thereof, in which the fluorine-containing lubricant is a fluorinated block/non-fluorinated block/fluorinated block triblock copolymer.

5 Claims, No Drawings

MAGNETIC RECORDING MEDIUM HAVING A FLUORINATED BLOCK POLYMERIC LUBRICANT

This application is a continuation application Ser. No. 08/327,407, filed on Oct. 21, 1994, now abandoned.

BACKGROUND OF THE INVENTION

1. Field of the Invention

The present invention relates to a magnetic recording medium such as a magnetic tape which comprises a magnetic layer on at least one surface of a non-magnetic substrate and a lubricant layer on the magnetic layer.

2. Description of the Related Art

A ferromagnetic metal thin film magnetic recording medium which is produced by depositing a ferromagnetic metal on a non-magnetic substrate by vacuum vapor deposition and the like has advantages that the magnetic layer can have a high resistance to magnetization while having a thin thickness and is excellent in high density recording characteristics. But, since binder resins are not used and the ferromagnetic thin metal film exhibits a smooth surface, the coefficient of friction between the thin metal film and a magnetic head increases so that the thin metal film easily abrades or is flawed such that the magnetic recording medium has poor durability or running properties.

To improve the durability and running properties of the ferromagnetic thin metal film magnetic recording medium, Japanese Patent KOKAI Publication Nos. 85427/1985, 236118/1987 and 210615/1990 propose the use of various fluorine-containing lubricants, such as perfluoropolyether base lubricants, fluorinated carboxylic acid ester base lubricants and partially fluorinated carboxylic acid ester base lubricants and so forth, added to the magnetic layer or coated on the magnetic layer surface.

With the coating type magnetic recording medium in which the magnetic layer is formed by bonding magnetic powder with a resin, the recording density is increased, and it is desirable to use the above fluorine-containing lubricant as a good substitute lubricant to a conventional hydrocarbon or silicone lubricant.

To add the fluorine-containing lubricant to the magnetic layer or coat the magnetic layer surface, this lubricant is dissolved in a fluorine-containing organic solvent and a coating, dipping or spraying procedure carried out. However, the fluorine-containing solvents are liable to destroy the environment, for example, destruction of the ozone layer. Further, since such solvents are expensive, a recovering cost is unavoidable.

SUMMARY OF THE INVENTION

One object of the present invention is to provide a magnetic recording medium having improved durability and running properties, which medium can avoid the use of fluorine-containing organic solvents when a fluorine-containing lubricant is used and, therefore, does not have a negative effect on the environment.

According to the present invention, there is provided a magnetic recording medium comprising a non-magnetic substrate and a magnetic layer formed on at least one surface of the substrate, having a fluorine-containing lubricant on the surface of or within the magnetic layer, wherein the fluorine-containing lubricant is a fluorinated block/non-fluorinated block/fluorinated block triblock copolymer.

In a preferred embodiment, each fluorinated block has at least 4 carbon atoms to which a fluorine atom is bonded, and the non-fluorinated block has at least 8 carbon atoms.

DETAILED DESCRIPTION OF THE INVENTION

The triblock copolymer which is used as the fluorine-containing lubricant has a structure such that the fluorinated blocks are bonded to both ends of the non-fluorinated block. Since both of the fluorinated blocks present at the molecular ends are not soluble in a general-purpose organic solvent while the non-fluorinated block has a high solubility in the general-purpose organic solvent, the non-fluorinated block may be present in a spread state in the general-purpose organic solvent so that the triblock copolymer, as a whole, may have solubility in the general-purpose organic solvent.

In the triblock copolymer, preferred examples of the non-fluorinated block are alkyl chains, polyether chains, polyester chains, polyamide chains, polycarbonate chains, and so on. Preferably, the non-fluorinated block has 1 to 1000 carbon atoms. More preferably, the non-fluorinated block has at least 8 carbon atoms, since the solubility of the non-fluorinated block in the general-purpose organic solvent decreases when the number of the carbon atoms is less than 8. In particular, the non-fluorinated block has at least 12 carbon atoms thus having a major effect and increases the breath of the selection of the solvent and concentration.

Preferred examples of the fluorinated block are fluoroalkyl chains, fluoropolyether chains, and so on. The fluorinated block may be a partly fluorinated block or a completely fluorinated block, such as a perfluoroalkyl chain or a perfluoropolyether chain. Since the fluorinated chain contracts in a general-purpose organic solvent, its chain length has little influence on the solubility of the copolymer. To achieve the lubricity which is specific to the fluorine-containing polymer, each fluorinated block has preferably 1 to 1000 carbon atoms, more preferably at least 4, in particular at least 6 carbon atoms to which a fluorine atom is bonded.

A molecular weight of the triblock copolymer is preferably $2.0 \times 10^4$ or less, more preferably $1.0 \times 10^4$ or less. When the molecular weight is $2.0 \times 10^4$ or less, the handling property of the lubricant is good when the lubricant layer is formed by, for example, spraying the lubricant solution on the magnetic recording medium.

The triblock copolymer may be prepared by any suitable process. One of the industrially advantageous processes is exemplified. A non-fluorinated compound having, at both ends, functional groups such as carboxyl groups, amino groups, hydroxyl groups, epoxy groups, isocyanate groups, halogen atoms and a fluorinated compound having, at one end, a functional group which is reactive with the above functional groups are used and reacted through their functional groups to chemically bond them by an ester bond, an amide bond, an ether bond, a urethane bond, a urea bond, and the like.

The present invention is characterized in that at least one of the above triblock copolymers is used as the fluorine-containing lubricant for the magnetic layer. If necessary, any other conventional lubricant may be used in combination. Examples of the other lubricants are aliphatic acids or their metal salts, aliphatic esters, aliphatic amides, aliphatic alcohols, monosulfides, paraffins, silicone compounds, esters of aliphatic compounds and fluorides, perfluoropolyethers, polytetrafluoroethylene, and so forth.

In the present invention, to provide the lubricant comprising the triblock copolymer on or in the magnetic layer surface, the lubricant is dissolved in a general-purpose organic solvent such as a hydrocarbon, an alcohol, a ketone, an ether and the like, and the resulting solution is coated or sprayed on the magnetic layer which has been formed on the non-magnetic substrate, or the magnetic layer is dipped in the solution, and then the applied solution is dried.

When the magnetic layer comprises a ferromagnetic metal thin film, a trace amount of water may be present on the surface of the thin film, or the thin film may be coated by a rust preventive such as a triazole type rust preventive or a protective film which is formed from an organic compound, carbon or silicon oxide by vacuum deposition, sputtering, plasma deposition, and the like. Among these, when a carbon film or a silicon oxide film is formed, the surface lubrication effect of the lubricant to be used in the present invention is more effectively achieved.

The amount of the lubricant coated on the ferromagnetic metal thin film is preferably from 0.5 to 20 mg/m$^2$, while it is from 10 to 100 mg/m$^2$ in the case of the coating type magnetic recording medium. When the coated amount is too small, it is difficult to coat the lubricant uniformly over the whole surface of the magnetic layer, so that still durability cannot be sufficiently improved. When the coated amount is too large, the magnetic head and the magnetic layer would normally undesirably stick to each other.

In the case of the coating type magnetic recording medium, in addition to the application of the lubricant by coating, spraying or dipping as described above, the lubricant may be mixed in a magnetic paint comprising a general-purpose organic solvent, and the paint coated on the non-magnetic substrate to form the magnetic layer containing the lubricant therein. On the thus formed magnetic layer, the lubricant may be further applied by coating, spraying or dipping.

As the non-magnetic substrate of the magnetic recording medium of the present invention, any conventional non-magnetic substrate may be used. Preferred examples are plastics such as polyethylene terephthalate, polyethylene naphthalate, polycarbonate, polyimide, polyvinyl chloride, etc., aluminum alloys, titanium alloys, and so forth. The non-magnetic substrate may be of any form such as a tape, a sheet, a disc or a card. The substrate may have protrusions on its surface.

In the case of the ferromagnetic metal thin film magnetic recording medium, a thin film of the ferromagnetic metal is formed on at least one surface of the non-magnetic substrate by vacuum deposition, ion plating, sputtering, plating and so forth. A thickness of the thus formed ferromagnetic metal thin film is preferably from 0.03 to 1 μm. Examples of the ferromagnetic metal are Co, Ni, Fe, Co-Ni, Co-Cr, Co-P, Co-Ni-P, Fe-Co-B, Fe-Co-Ni, Co-Ni-Fe-B, Fe-Ni, Fe-Co, Co-Pt, Co-Ni-Pt, and these metals or metal alloys containing oxygen.

In the case of the coating type magnetic recording medium, a magnetic paint containing magnetic powder and a binder resin is coated on at least one surface of the non-magnetic substrate to form the magnetic paint layer having a thickness of usually from about 0.1 to 10 μm. The magnetic layer may contain any of the conventional additives such as a filler, an antistatic agent, a dispersant, a colorant, and so forth.

As the magnetic powders, any one of the known magnetic powder can be used. Examples of the magnetic powder are oxide magnetic powder such as γ-Fe$_2$O$_3$, Fe$_3$O$_4$, an intermediate state iron oxide between γ-Fe$_2$O$_3$ and Fe$_3$O$_4$, Co-containing γ-Fe$_2$O$_3$, Co-containing Fe$_3$O$_4$, CrO$_2$, barium ferrite, and so forth; metal magnetic powder, such as Fe, Co, Fe-Ni-Cr alloy, and the like; and nitride magnetic powder such as iron nitride; and so forth.

Preferably, needle shape magnetic powder particles have an average particle size (of a longer axis) of from about 0.2 to 1 μm, and an average aspect ratio (average longer axis length/average shorter axis length) from about 5 to 10. In the case of the plate form magnetic powder, an average longer axis length is preferably from about 0.07 to 0.3 μm.

As a binder resin, any one of these resins which are used as the binder resin of a magnetic recording medium may be used. Examples of the binder resin are vinyl chloride-vinyl acetate copolymers, cellulose resins, polyurethane resins, polyester resins, polyvinyl butyral resins, polyacrylic resins, epoxy resins, phenol resins, polyisocyanate compounds, and so forth.

When the magnetic layer is formed only on one surface of the non-magnetic substrate, a back coat layer may be formed on the opposite surface. The back coat layer is formed by mixing and dispersing non-magnetic powder such as carbon black, calcium carbonate, and the like together with a binder resin such as a vinyl chloride-vinyl acetate copolymer, a polyurethane resin, and a cellulose resin, and an organic solvent to obtain a back coat paint, coating this paint on the surface of the non-magnetic substrate opposite to the magnetic layer and drying the coated paint.

In the present invention, since the fluorine-containing lubricant comprising the specific triblock copolymer is used, it can be applied by coating, dipping or spraying using the generally used organic solvent. Therefore, the present invention does not lead to any destruction of environment which is caused by the use of the fluorine-containing organic solvent and can provide the magnetic recording medium having improved durability and running properties.

The present invention will be illustrated by comparing Examples of the present invention with Comparative Examples.

The triblock copolymers A to F which were used in Examples were prepared in following Preparation Examples 1–6, respectively. Hereinafter, "parts" are "parts by weight".

PREPARATION EXAMPLE 1

Polybutylene adipate diol having hydroxyl groups at both molecular ends (average molecular weight of 600) (300 parts) and a fluorinated ether compound having a carboxyl group at one molecular end (a carboxyl-modified GALDEN MONO ACID manufactured by Montecatini, Italy; average molecular weight of 650) (650 parts) were reacted at 150° C. for 5 hours with bubbling nitrogen gas to obtain Triblock copolymer A represented by the formula:

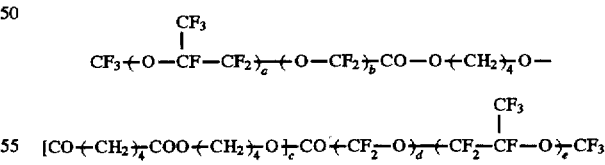

wherein a, b, c, d and e are numbers originated from the raw materials.

PREPARATION EXAMPLE 2

Polyethylene glycol having hydroxyl groups at both molecular ends (average molecular weight of 200) (100 parts) and a fluorinated ether compound having a carboxyl group at one molecular end (a carboxyl-modified GALDEN MONO ACID manufactured by Montecatini, Italy; average molecular weight of 650) (650 parts) were reacted at 150° C.

for 5 hours with bubbling nitrogen gas to obtain Triblock copolymer B represented by the formula:

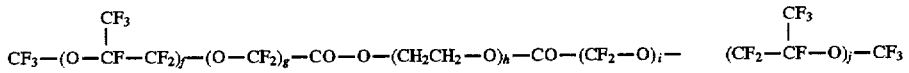

wherein f, g, h, i and j are numbers originated from the raw materials.

PREPARATION EXAMPLE 3

1,12-Dodecane diol having hydroxyl groups at both molecular ends (101 parts) and a fluorinated ether compound having a carboxyl group at one molecular end (a carboxyl-modified GALDEN MONO ACID manufactured by Montecatini, Italy; average molecular weight of 650) (650 parts) were reacted at 150° C. for 5 hours with bubbling nitrogen gas to obtain Triblock copolymer C represented by the formula:

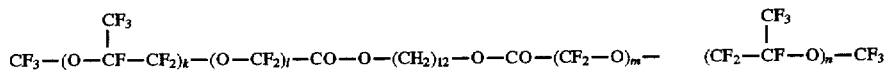

wherein k, l, m and n are numbers originated from the raw materials.

PREPARATION EXAMPLE 4

1,12-Diaminododecane having amino groups at both molecular ends (100 parts) and a fluorinated ether compound having a carboxyl group at one molecular end (a carboxyl-modified GALDEN MONO ACID manufactured by Montecatini, Italy; average molecular weight of 650) (650 parts) were reacted at 150° C. for 5 hours with bubbling nitrogen gas to obtain Triblock copolymer D represented by the formula:

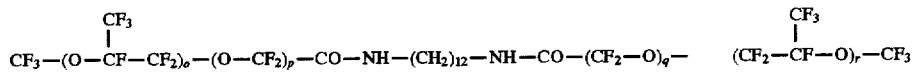

wherein o, p, q and r are numbers originated from the raw materials.

PREPARATION EXAMPLE 5

1,12-Dodecane diol having hydroxyl groups at both molecular ends (101 parts) and, as a fluorinated compound having a carboxyl group at one molecular end, perfluoro-n-octanoic acid (464 parts) were reacted at 150° C. for 5 hours with bubbling nitrogen gas to obtain Triblock copolymer E represented by the formula:

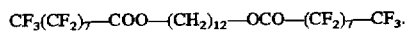

PREPARATION EXAMPLE 6

1,12-Diaminododecane having amino groups at both molecular ends (100 parts) and, as a fluorinated compound having a carboxyl group at one molecular end, perfluoro-n-octanonic acid (464 parts) were reacted at 150° C. for 5 hours with bubbling nitrogen gas to obtain Triblock copolymer E represented by the formula:

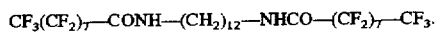

EXAMPLE 1

A polyethylene terephthalate film having a thickness of 10 μm was installed in a vacuum deposition apparatus, and a Co-Ni alloy was heated and evaporated in an oxygen gas under pressure of $5 \times 10^{-5}$ Torr and continuously deposited on the film in an inclined direction to form a ferromagnetic metal thin film comprising Co-Ni-O (a weight ratio of Co to Ni being 80:20) on the film. Then, the film was cut to a width of 8 mm.

Triblock copolymer A was dissolved in isopropanol at a concentration of 0.1% by weight. In the formed solution of the lubricant, the above ferromagnetic metal thin film was dipped and dried to obtain a video tape having a lubricant layer comprising Triblock copolymer A on the ferromagnetic metal thin film.

EXAMPLE 2

In the same manner as in Example 1 except that Triblock copolymer B was used in place of Triblock copolymer A, a video tape having a lubricant layer comprising Triblock copolymer B on the ferromagnetic metal thin film was produced.

EXAMPLE 3

In the same manner as in Example 1 except that Triblock copolymer C was used in place of Triblock copolymer A, a video tape having a lubricant layer comprising Triblock copolymer C on the ferromagnetic metal thin film was produced.

EXAMPLE 4

In the same manner as in Example 1 except that Triblock copolymer D was used in place of Triblock copolymer A, a video tape having a lubricant layer comprising Triblock copolymer D on the ferromagnetic metal thin film was produced.

EXAMPLE 5

In the same manner as in Example 1 except that Triblock copolymer E was used in place of Triblock copolymer A, a video tape having a lubricant layer comprising Triblock copolymer E on the ferromagnetic metal thin film was produced.

EXAMPLE 6

In the same manner as in Example 1 except that Triblock copolymer F was used in place of Triblock copolymer A, a video tape having a lubricant layer comprising Triblock copolymer F on the ferromagnetic metal thin film was produced.

EXAMPLE 7

In the same manner as in Example 4 except that a diamond-like carbon film was formed on the ferromagnetic metal thin film, a video tape having a lubricant layer comprising Triblock copolymer D on the ferromagnetic metal thin film was produced.

COMPARATIVE EXAMPLE 1

A fluorinated ether compound having a carboxyl group at one molecular end (a carboxyl-modified GALDEN MONO ACID manufactured by Montecatini, Italy; average molecular weight of 650) was dissolved in 1,1,2-trifluoro-1,2,2-trichloroethane at a concentration of 0.1% by weight to prepare a lubricant solution.

In the same manner as in Example 1 except that this solution was used, a video tape having a lubricant layer comprising the above fluorinated ether compound on the ferromagnetic metal thin film was produced.

COMPARATIVE EXAMPLE 2

As a fluorinated compound having a carboxyl group at one molecular end, perfluoro-n-octanoic acid was dissolved in 1,1,2-trifluoro-1,2,2-trichloroethane at a concentration of 0.1% by weight to prepare a lubricant solution.

In the same manner as in Example 1 except that this solution was used, a video tape having a lubricant layer comprising perfluoro-n-octanoic acid on the ferromagnetic metal thin film was produced.

COMPARATIVE EXAMPLE 3

A fluorinated ether compound having ester groups at both molecular ends (DEAL manufactured by Montecatini, Italy) was dissolved in 1,1,2-trifluoro-1,2,2-trichloroethane at a concentration of 0.1% by weight to prepare a lubricant solution.

In the same manner as in Example 1 except that this solution was used, a video tape having a lubricant layer comprising the above fluorinated ether compound on the ferromagnetic metal thin film was produced.

COMPARATIVE EXAMPLE 4

In the same manner as in Comparative Example 3 except that the tape having the diamond-like carbon film on the metal thin film produced in Example 7 was used, a video tape having a lubricant layer comprising the above fluorinated ether compound on the ferromagnetic metal thin film was produced.

With each of the video tapes produced in Examples 1–7 and Comparative Examples 1–4, still durability was measured to evaluate the lubrication effect.

A solubility of each of the lubricants used in Examples and Comparative Examples in a general-purpose solvent was measured.

The results are shown in Table 1 below.

The still durability and the solubility were tested by the following methods.

STILL DURABILITY

At 20° C. and 50% RH, a still life time at which a reading output decreased by 6 dB from the original value was measured using a 8 mm VTR (EV-S 900 manufactured by Sony).

SOLUBILITY

In isopropanol as a general-purpose solvent, each lubricant was added portion by portion and thoroughly stirred. The lubricant which was dissolved at a concentration of 0.05% by weight or larger was ranked "O", while the lubricant which was dissolved at a concentration of less than 0.05% by weight was ranked "X".

TABLE 1

|  | Solubility in general-purpose solvent | Still life time (min.) |
| --- | --- | --- |
| Example 1 | O | 40 |
| Example 2 | O | 45 |
| Example 3 | O | 55 |
| Example 4 | O | 60 |
| Example 5 | O | 40 |
| Example 6 | O | 45 |
| Example 7 | O | 70 |
| Comp. Ex. 1 | X | 25 |
| Comp. Ex. 2 | X | 5 |
| Comp. Ex. 3 | X | 45 |
| Comp. Ex. 4 | X | 40 |

As seen from the results in Table 1, each of the lubricants of the present invention used in Examples 1–7 had the higher solubility in the general-purpose solvent than the conventional fluorine-containing lubricants used in Comparative Examples 1–4, and the still life times of the former were the same as or higher than those of the conventional fluorine-containing lubricant. From these results, it is seen that the video tape produced by the present invention does not deteriorate the lubricating property and is excellent in environment protection.

EXAMPLE 8

A composition comprising α-Fe iron magnetic powder (coercive force of 1500 Oe and saturation magnetization of 120 emu/g) (100 parts), a vinyl chloride-vinyl acetate-vinyl alcohol copolymer (VAGH manufactured by UCC) (20 parts), a polyfunctional isocyanate compound (5 parts), carbon black (3 parts), $\alpha\text{-}Al_2O_3$ powder (3 parts), myristic acid (2 parts), Triblock copolymer A (2.5 parts), cyclohexanone (130 parts) and toluene (130 parts) was mixed and dispersed in a ball mill for 72 hours to prepare a magnetic paint.

This magnetic paint was coated on a polyethylene terephthalate film having a thickness of 20 μm to a thickness of 5 μm after drying, and dried to form a magnetic layer. After calendering, the film was cut to a width of 8 mm.

Then, the magnetic layer was dipped in a lubricant solution of Triblock copolymer A in isopropanol at a concentration of 0.1% by weight, and dried to produce a video tape.

EXAMPLE 9

In the same manner as in Example 8 except that Triblock copolymer B was used in place of Triblock copolymer A which was used in the preparation of the magnetic paint and the lubricant solution, a video tape was produced.

EXAMPLE 10

In the same manner as in Example 8 except that Triblock copolymer C was used in place of Triblock copolymer A which was used in the preparation of the magnetic paint and the lubricant solution, a video tape was produced.

EXAMPLE 11

In the same manner as in Example 8 except that Triblock copolymer D was used in place of Triblock copolymer A which was used in the preparation of the magnetic paint and the lubricant solution, a video tape was produced.

EXAMPLE 12

In the same manner as in Example 8 except that Triblock copolymer E was used in place of Triblock copolymer A which was used in the preparation of the magnetic paint and the lubricant solution, a video tape was produced.

EXAMPLE 13

In the same manner as in Example 8 except that Triblock copolymer F was used in place of Triblock copolymer A which was used in the preparation of the magnetic paint and the lubricant solution, a video tape was produced.

COMPARATIVE EXAMPLE 5

In the same manner as in Example 8 except that the fluorinated ether compound having a carboxyl group at one molecular end which was used in Comparative Example 1 was used in place of Triblock copolymer A contained in the magnetic paint, and as a lubricant solution, a solution of this fluorinated compound in 1,1,2-trichloro-1,2,2-trifluoroethane at a concentration of 0.1% by weight was used, a video tape was produced.

COMPARATIVE EXAMPLE 6

In the same manner as in Example 8 except that, as the fluorinated compound having carboxyl groups at one molecular end, perfluoro-n-octanoic acid as used in Comparative Example 2 was used in place of Triblock copolymer A contained in the magnetic paint, and as a lubricant solution, a solution of this fluorinated compound in 1,1,2-trichloro-1,2,2-trifluoroethane at a concentration of 0.1% by weight was used, a video tape was produced.

COMPARATIVE EXAMPLE 7

In the same manner as in Example 8 except that the fluorinated ether compound having ester groups at both molecular ends which was used in Comparative Example 3 was used in place of Triblock copolymer A contained in the magnetic paint, and as a lubricant solution, a solution of this fluorinated compound in 1,1,2-trichloro-1,2,2-trifluoroethane at a concentration of 0.1% by weight was used, a video tape was produced.

With each of the video tapes produced in Examples 8–13 and Comparative Examples 5–7, the still durability was measured in the same manner as above to evaluate the lubrication effect. The results are shown in Table 2.

TABLE 2

|  | Still life time (min.) |
| --- | --- |
| Example 8 | 55 |
| Example 9 | 50 |
| Example 10 | 55 |
| Example 11 | 65 |
| Example 12 | 50 |
| Example 13 | 50 |
| Comp. Ex. 5 | 20 |
| Comp. Ex. 6 | 10 |
| Comp. Ex. 7 | 40 |

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium comprising a non-magnetic substrate and a magnetic layer formed on at least one surface of said substrate, said magnetic layer containing a fluorine-containing lubricant on or in a surface thereof, wherein said fluorine-containing lubricant is a fluorinated block/non-fluorinated block/fluorinated block triblock copolymer, wherein each of said fluorinated blocks has at least 4 carbon atoms to which a fluorine atom is bonded and said non-fluorinated block has at least 8 carbon atoms and is at least one block selected from the group consisting of a polybutylene adipate group, a polyoxyethylene group and a dodecyl group, and said fluorinated block and said non-fluorinated block are bonded through at least one bond selected from the group consisting of an amide bond, an ester bond, an ether bond, a urethane bond and a urea bond; and wherein said lubricant is soluble in isopropanol at a concentration of 0.05% or more, by weight.

2. The magnetic recording medium according to claim 1, wherein said fluorinated block comprises at least one block selected from the group consisting of a fluoroether chain having from 4 to 1000 carbon atoms and a fluoroalkyl chain having from 4 to 1000 carbon atoms.

3. The magnetic recording medium according to claim 1, wherein said magnetic layer comprises a thin film ferromagnetic metal and said fluorine-containing lubricant is from 0.5 to 20 mg/m$^2$.

4. The magnetic recording medium according to claim 3, which further comprises one member selected from the group consisting of a carbon film and a silicon oxide film on said ferromagnetic metal thin film.

5. The magnetic recording medium according to claim 1, wherein said fluorine-containing lubricant is applied to said magnetic layer in an amount of from 10 to 100 mg/m$^2$.

* * * * *